United States Patent
Miyajima

(10) Patent No.: US 7,894,104 B2
(45) Date of Patent: Feb. 22, 2011

(54) APPARATUS FOR EMBEDDING INFORMATION AND PERFORMING PROCESSING BASED ON EMBEDDED INFORMATION, AND METHOD OF CONTROLLING SAME

(75) Inventor: Jun Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 12/034,981

(22) Filed: Feb. 21, 2008

(65) Prior Publication Data

US 2008/0204787 A1  Aug. 28, 2008

(30) Foreign Application Priority Data

Feb. 23, 2007 (JP) ............................. 2007-044039

(51) Int. Cl.
  *G06K 15/02* (2006.01)
  *G06K 19/00* (2006.01)
(52) U.S. Cl. .................. 358/3.28; 358/1.14; 235/375
(58) Field of Classification Search .............. 358/1.9, 358/3.28, 1.14, 1.13, 468; 283/72, 113, 902; 235/375, 487, 494; 399/366; 340/5.86; 347/107
See application file for complete search history.

(56) References Cited

U.S. PATENT DOCUMENTS

| | | | |
|---|---|---|---|
| 7,227,661 B2 * | 6/2007 | Matsunoshita | 358/1.14 |
| 7,567,355 B2 * | 7/2009 | Matsunoshita | 358/1.13 |
| 7,684,089 B2 * | 3/2010 | Yamada | 358/3.28 |
| 2004/0148507 A1 | 7/2004 | Iwamura et al. | |
| 2004/0184065 A1 * | 9/2004 | Guan et al. | 358/1.14 |
| 2006/0209326 A1 | 9/2006 | Higashiura | |
| 2007/0127055 A1 * | 6/2007 | Kujirai et al. | 358/1.14 |
| 2008/0018942 A1 * | 1/2008 | Komiya | 358/3.28 |

FOREIGN PATENT DOCUMENTS

| | | |
|---|---|---|
| JP | 2004-228897 A | 8/2004 |
| JP | 2006-041906 A | 2/2006 |
| JP | 2006-261832 A | 9/2006 |

* cited by examiner

*Primary Examiner*—Scott A Rogers
(74) *Attorney, Agent, or Firm*—Canon U.S.A., Inc., IP Division

(57) ABSTRACT

An apparatus and method that allow a user to copy a copy-protected document where copy-protection information is embedded in the document and copy-protection-cancellation information is embedded in a form different from the document, where the copy-protection-cancellation information is used to cancel the copy protection.

7 Claims, 15 Drawing Sheets

APPARATUS FOR EMBEDDING INFORMATION AND PERFORMING PROCESSING BASED ON EMBEDDED INFORMATION, AND METHOD OF CONTROLLING SAME

BACKGROUND OF THE INVENTION

1. Field of the Invention

The present invention relates to an image-forming apparatus (image-processing apparatus) configured to control copy operations based on information about copy (reproduction) protection, where the information is included in image data, a method of controlling the image-forming apparatus, a program, and a storage medium.

2. Description of the Related Art

There has been a technology achieved to restrict copying by embedding information indicating that copying is allowed under a predetermined condition and/or information indicating that protection is provided against copying in a printed matter, as dot patterns and/or barcodes, so that security against the printed matter is ensured. However, there has been the demand for restricting copying for an ordinary user while allowing a specific user to perform copying. An image-forming apparatus disclosed in Japanese Patent Laid-Open No. 2004-228897 determines whether copying should be prohibited or allowed by making a user input a password when the copying is restricted.

Even though there has been a demand for restricting copying for the ordinary user while allowing the specific user to perform copying, another demand has arisen to allow a specific user to perform copying without manually inputting password data embedded in a document protected from copying.

SUMMARY OF THE INVENTION

The present invention provides an apparatus that can allow a specific user to copy image data protected from copying without manually inputting password data embedded in the image data protected from copying.

An image-forming apparatus according to an embodiment of the present invention includes an image-read unit configured to read image data, a first determination unit configured to determine whether the read image data includes copy-protection-cancellation information indicating cancellation of copy protection, a storage unit configured to store first identification information when it is determined that the read image data includes the copy-protection-cancellation information, wherein the first identification information is included in the image data including the copy-protection-cancellation information, a second determination unit configured to determine whether the read image data includes copy-protection information indicating the copy protection, a comparison unit configured to compare the first identification information with a second identification information included in the image data including the copy-protection information when it is determined that the read image data includes the copy-protection information, a print unit configured to perform printing based on the image data including the copy-protection information when a result of the comparison shows that the first identification information agrees with the second identification information, and a prohibition unit configured to prohibit printing based on the image data including the copy-protection information when the comparison result shows that the first identification information does not agree with the second identification information.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

Figure 1:
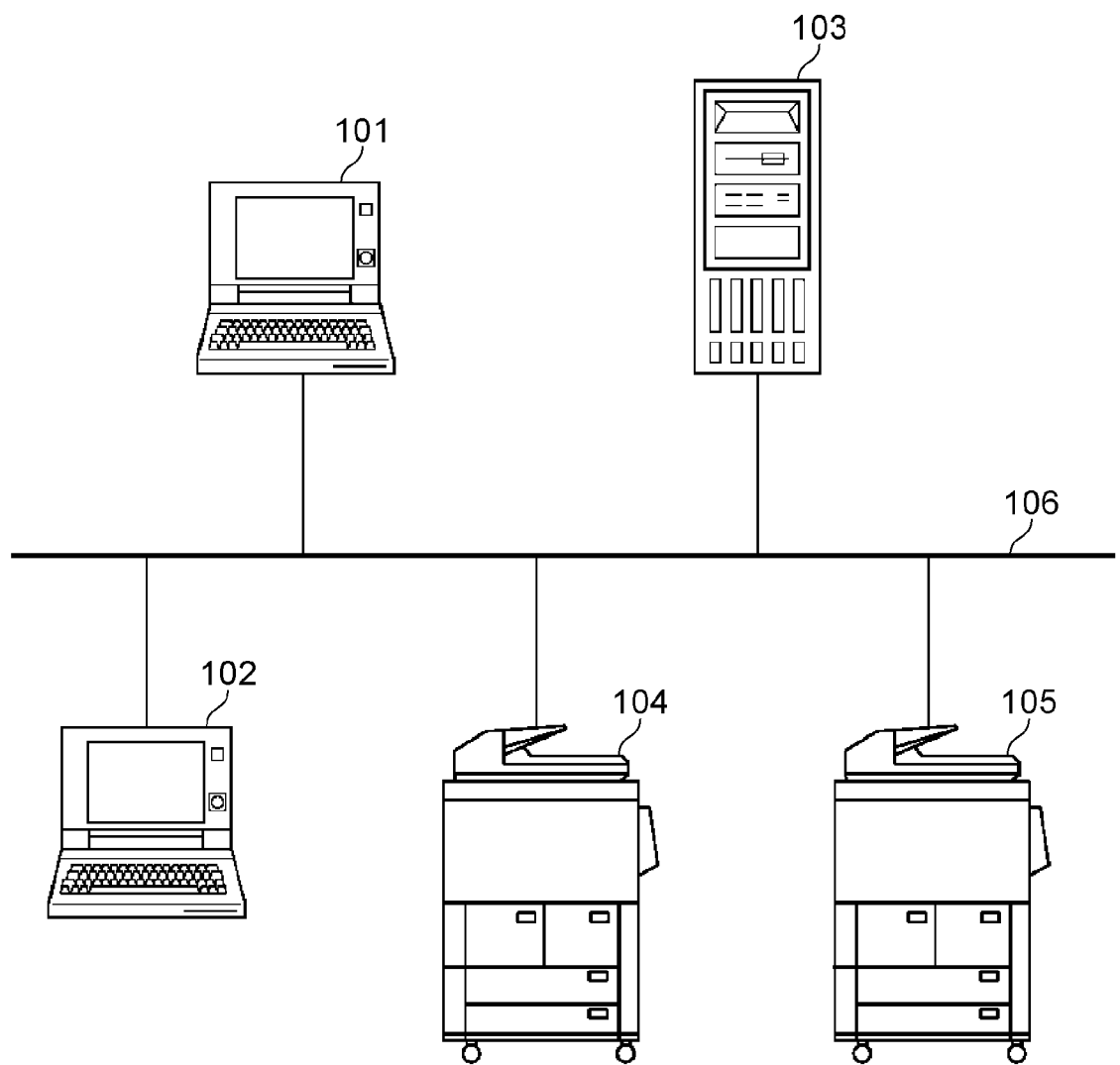
FIG. 1 is an illustration of a network system including an image-forming apparatus according to an embodiment of the present invention.

FIG. 1 is an illustration of a network system including an image-forming apparatus according to an embodiment of the present invention.

Client personal computers (PCs) 101 and 102, a print server 103, and image-forming apparatuses 104 and 105 are connected to one another via a local-area network (LAN) 106. The client PCs 101 and 102, print server 103, and image-forming apparatuses 104 and 105 communicate with one another via the LAN 106.

A user operates the client PC 101 and/or the client PC 102 so that the client PC 101 and/or the client PC 102 generates print data, and transmits the print data to the print server 103.

The print server 103 retransmits the transmitted print data to the image-forming apparatus 104 and/or the image-forming apparatus 105.

The image-forming apparatus 104 and/or the image-forming apparatus 105 interprets the transmitted print data, converts the interpreted print data into different print data, and prints an image generated based on the different print data onto a form so that a printed matter is generated.

The present invention is not limited to the above-described configuration, and any configuration that would enable practice of the present invention is applicable. For example, the above-described network system need not include the print server 103. In that case, the client PC 101 and/or the client PC 102 directly transmit the print data to the image-forming apparatus 104 and/or the image-forming apparatus 105.

An instruction for embedding copy-protection information (reproduction-protection information) and/or copy-protection-cancellation information (reproduction-protection-cancellation information), and copy-protection operations will now be described.

First, general operations of the above-described network system will be briefly described. When a user operates the client PC 101 and/or the client PC 102 in the configuration shown in FIG. 1, the user issues an instruction for embedding the copy-protection information in a printed matter for outputting. As a result, image data is embedded in the printed matter output from the image-forming apparatus 104 and/or the image-forming apparatus 105, where the image data includes the copy-protection information as background-image data.

Figure 2:
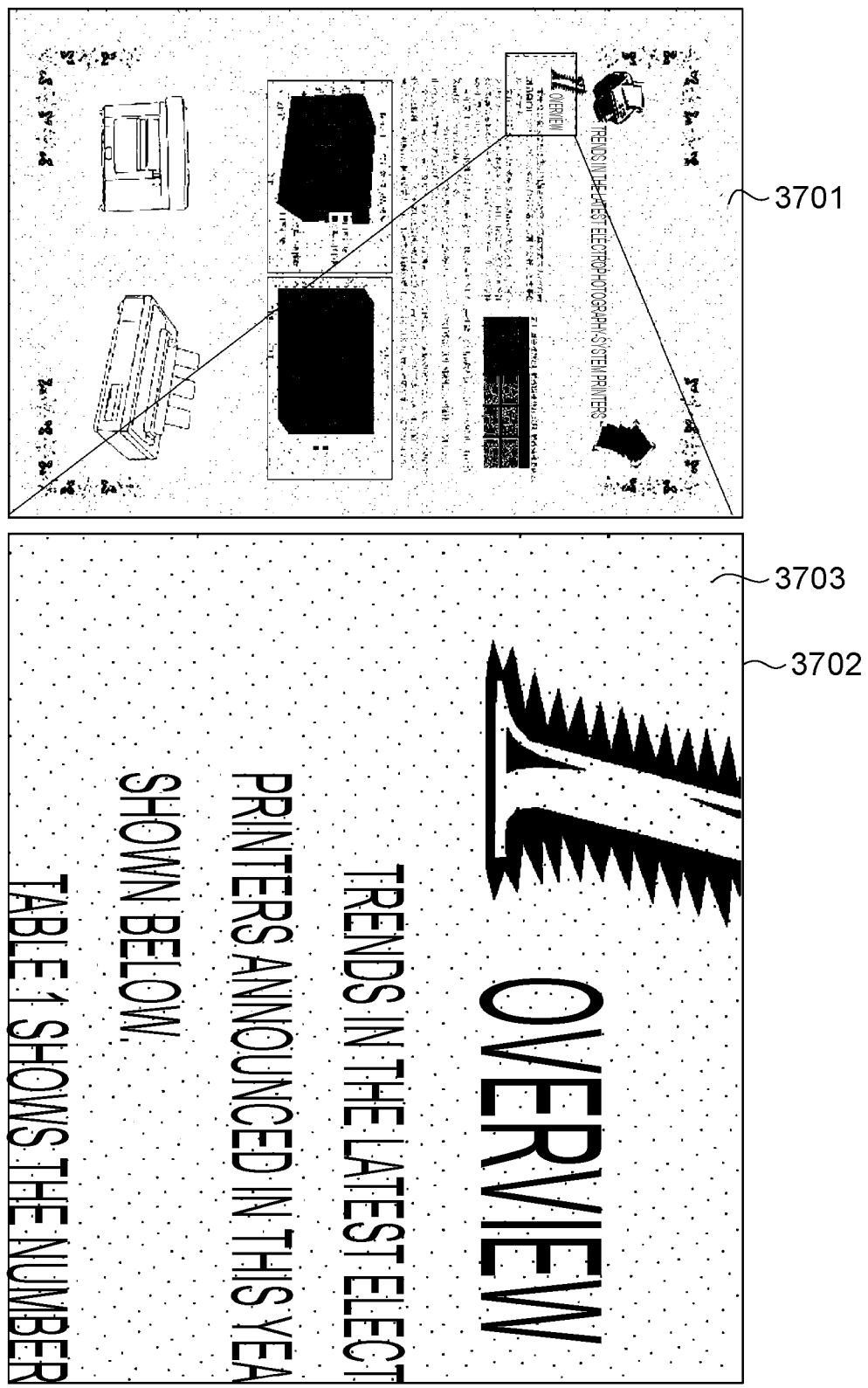
FIG. 2 illustrates an example document where an LVBC is embedded.

The background-image data may be generated, for example, by using a low visibility barcode (LVBC). FIG. 2 illustrates an example printed matter including the background-image data generated by using the LVBC. FIG. 2 is described in detail below.

Further, specific operations started from operations performed by the user and ended with generation of the printed matter are described below with reference to FIGS. 12 and 14.

If the user wishes to copy a document including the copy-protection information, as shown in FIG. 2, by using the image-forming apparatus 104 and/or the image-forming apparatus 105, the image-forming apparatus 104 and/or the image-forming apparatus 105 detects that the copy-protection information is included in the document, and stops performing the copy operations. Thus, an important document can be protected from copying.

Next, the LVBC will be described as an information-embedding technology according to the present embodiment of the present invention.

Hereinafter, an information-embedding unit provided in a printing device denotes a unit configured to print desired data in addition to original image data that should be printed on an image-forming medium (hereinafter referred to as the sheet), as a system. The image-forming medium includes a form, an overhead-projector (OHP) sheet, etc.

Requirements of a commonly used information-embedding unit include: being capable of embedding a required amount of information in a sheet;

being capable of extracting information embedded in the sheet by using a color material including toner, ink, etc. later without fail, as digital information;

being resistant to factors interfering with the information extraction when copying data on an image shown on a document on the sheet, such as the rotation, magnification, reduction, and partial deletion of the image, signal weakening occurring due to copying, soil, etc. to a certain extent; and having real-time property and/or high-speed property comparable thereto to extract embedded information at the copying time, whereby a copy-protected document is protected from copying.

The LVBC of the present embodiment satisfies the above-described requirements. FIG. 2 is an example image of a document where information is embedded using the LVBC.

Reference numeral 3701 denotes the entire sheet and reference numeral 3702 denotes a magnified view of a part of the entire sheet 3701. The magnified view 3702 shows many dots (e.g., dots 3703) that appear to be randomly embedded in addition to an image which should be originally drawn on the sheet 3701. The information is embedded in the dots.

Next, a method of embedding the information by using the LVBC will be described.

In the case where the LVBC is used, a dot pattern referred to as a grid is printed to embed additional information, in addition to an image printed on a sheet. In FIG. 2, the dots 3703 indicate dots forming the grid. The grid is a set of dots spaced at regular intervals in horizontal and vertical directions. When following the shortest distances between the dots forming the grid by drawing a virtual line (guide line), a virtual grid pattern including lines drawn at predetermined intervals appears.

The additional information to be embedded is input as binary data of a predetermined size or less. The additional information is embedded to be displaced from the center point in eight directions including vertical and horizontal directions with reference to each of the dots forming the grid.

Figure 3:
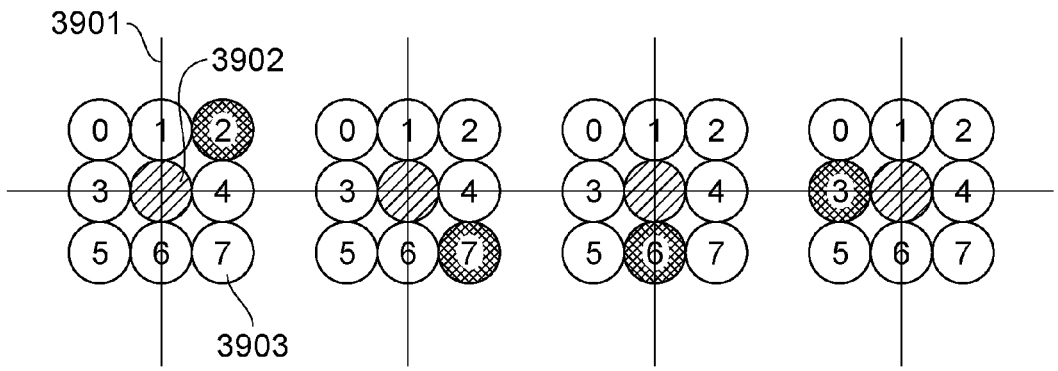
FIG. 3 shows an example where binary data 010111110011b is embedded, as additional information.

FIG. 3 shows an example where the binary data 010111110011 is embedded as the additional information.

In FIG. 3, each of vertical and horizontal lines 3901 is a virtual guideline showing the grid position. When the shortest distances between the grids are linked by drawing lines, a grid pattern appears. Reference numeral 3902 indicates the center point where no dot is placed. Reference numeral 3903 represents a dot that is arranged to be displaced from the center point 3902.

The binary data 010111110011 is divided into groups of three bits, namely, 010, 111, 110, and 011. Each of the groups of three bits is subjected to decimal conversion so that circles 2, 7, 6, and 3 are obtained.

As shown in FIG. 3, each of the dots forming the grid is displaced in any of the eight directions, including the vertical and horizontal directions, with respect to a numerical value, whereby information can be expressed. In that case, the circles 2, 7, 6, and 3 are displaced to the upper right, the lower right, the left, and downward so that information can be embedded.

By performing the above-described processing repeatedly, additional information of approximately 2000 bytes can be embedded in a sheet by using the LVBC. Since dots representing the additional information are repeatedly embedded in the sheet, redundancy increases. Subsequently, the reliability of copying is increased so that erroneous recognition as the image that should be originally printed on the sheet is reduced. Further, copying can be performed with increased reliability even though the sheet is soiled, creased, partially damaged, etc.

Next, a series of operations performed to issue an instruction to embed the copy-protection information and achieve copy protection will be described.

Figure 4:
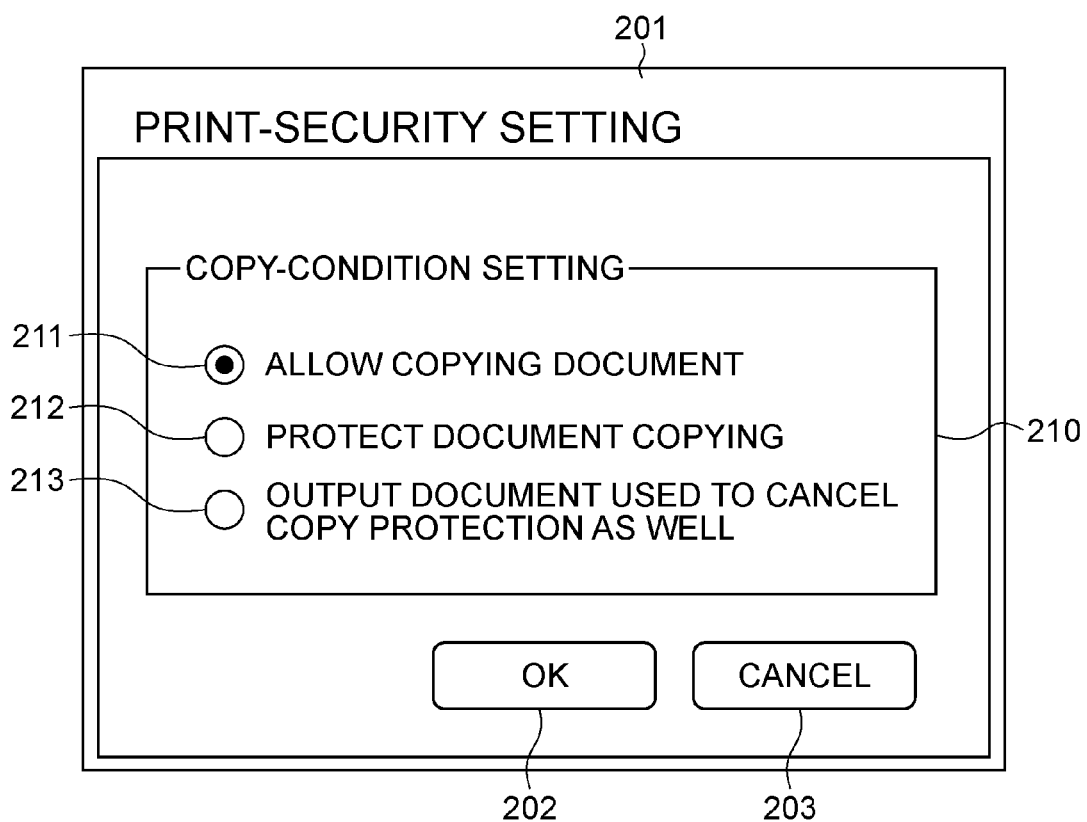
FIG. 4 shows an example setting-screen image of a printer driver of a client PC.

FIG. 4 shows an example setting-screen image of a printer driver provided in the client PC 101 and/or the client PC 102.

In FIG. 4, the user can specify information which the user wishes to embed in a printed matter by selecting one of radio buttons and/or pressing down buttons shown on a dialogue image 201 provided to make print-security settings.

According to the present embodiment, in a copy-condition-setting area 210, the user operates one of the radio buttons to select one of the following copy-condition modes:

allow copying document (button 211), protect document from copying at all times (button 212), and output document used to cancel copy protection with original document (button 213).

When the user presses down an OK button 202, job-restriction information indicating which of the radio buttons is selected is stored in a job-restriction-information-storage unit described below with reference to FIG. 12. An example screen image produced when the image-forming apparatus 104 and/or the image-forming apparatus 105 detects that the document includes the copy-protection information will now be described.

Figure 5:
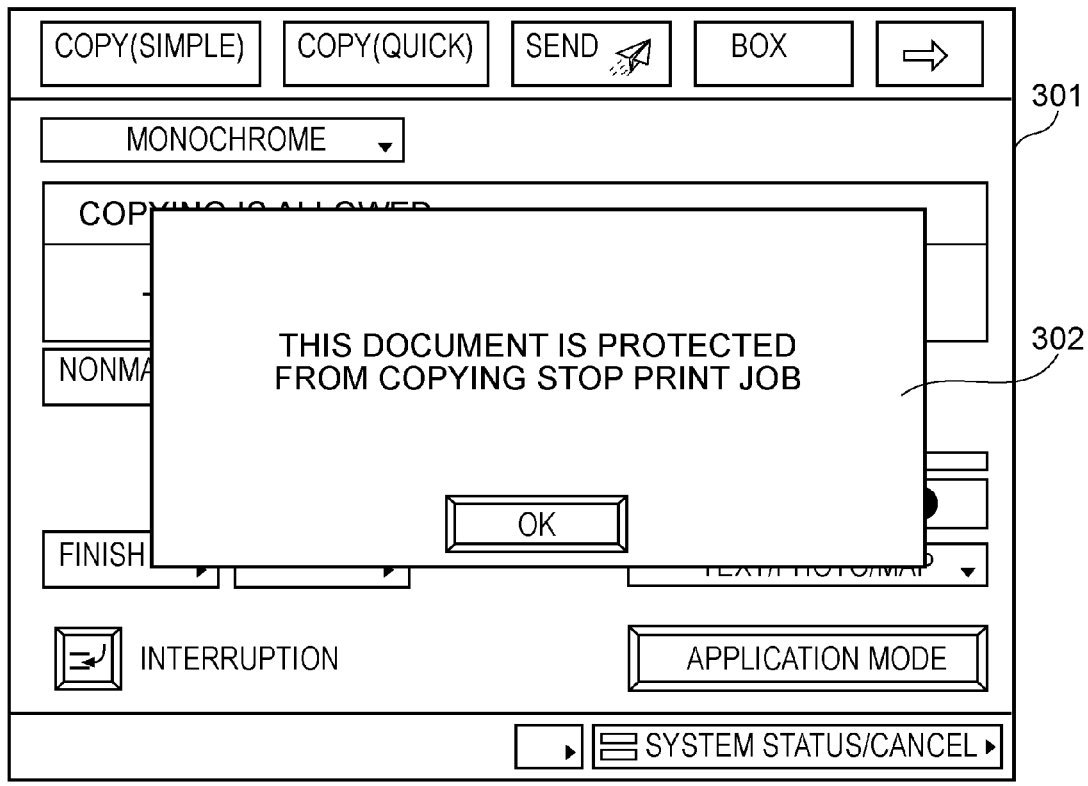
FIG. 5 shows an example screen image produced when the image-forming apparatus detects that a document includes copy-protection information and stops performing copy operations.

The example screen image will be produced on an operation unit shown in FIG. 8, which is described below. FIG. 5 shows an example screen image produced when the image-forming apparatus 104 and/or the image-forming apparatus 105 detects that a document includes the copy-protection information and stops performing the copy operations. The document is a document where the copy-protection information is embedded by the user selecting the mode "protect document from copying at all times" (button 212) from among the three copy-condition modes shown in FIG. 4.

In FIG. 5, a message-dialogue box 302 showing that the copy operations are stopped is shown in an operation-screen image 301.

Figure 6:
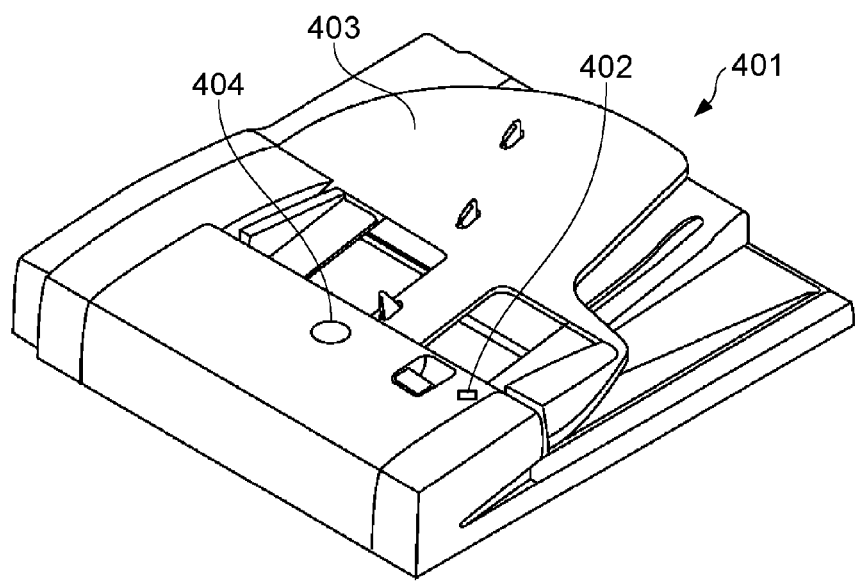
FIG. 6 is an external perspective view of a scanner unit provided in the image-forming apparatus.

FIG. 6 is an external view of a scanner unit 401 provided in the image-forming apparatus 104 and/or 105 shown in FIG. 1.

A document is placed on a tray 403 of a document feeder 402 of the scanner unit 401. When the user instructs to read data through an operation unit, a controller transmits a read instruction to the scanner unit 401.

Figure 7:
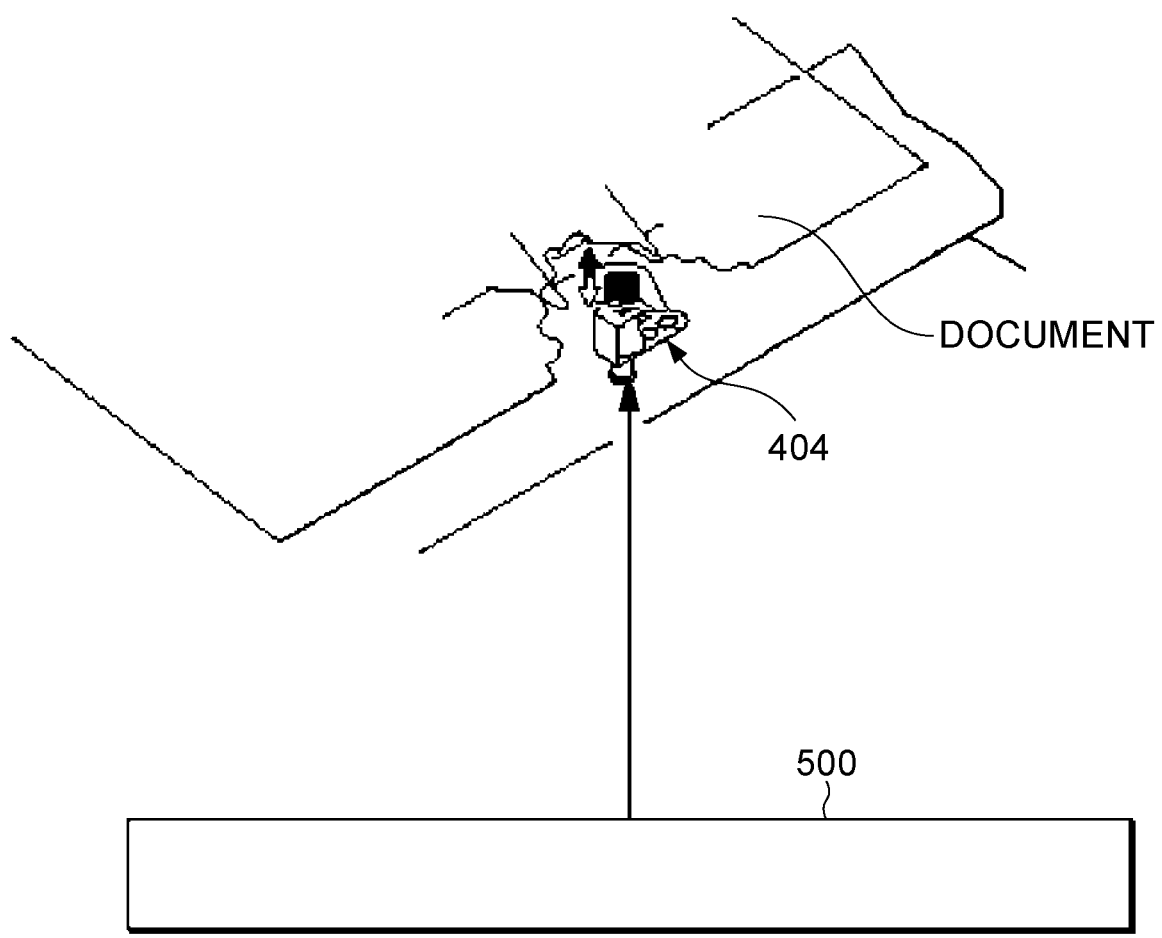
FIG. 7 illustrates operations of a stamp shown in FIG. 6.

Upon receiving the read instruction, the scanner unit 401 feeds documents one by one from the tray 403 and performs operations to read image data shown on each of the documents. The document feeder 402 includes a stamp (stamping unit) 404 configured to put a stamp on a document from which image data had already been read, where the stamp indicates that data reading is finished. Hereinafter, the above-described stamp is referred to as a stamp indicating "checked". FIG. 7 illustrates operations of the stamp 404 shown in FIG. 6.

The stamp 404 puts the stamp indicating "checked" on a document from which the image data had already been read through a mechanism driven by using electromagnetic force. A controller 500 transmits an instruction to turn on and/or off the electromagnetic force.

Further, data on an image shown on a document can be read not only by an automatic-feeding method performed by the document feeder 402 but also by the method of placing a document on a glass plate (not shown). At that time, however, a restriction is imposed so that it becomes difficult to put the stamp indicating "checked" on the document by using the stamp 404.

Figure 8:
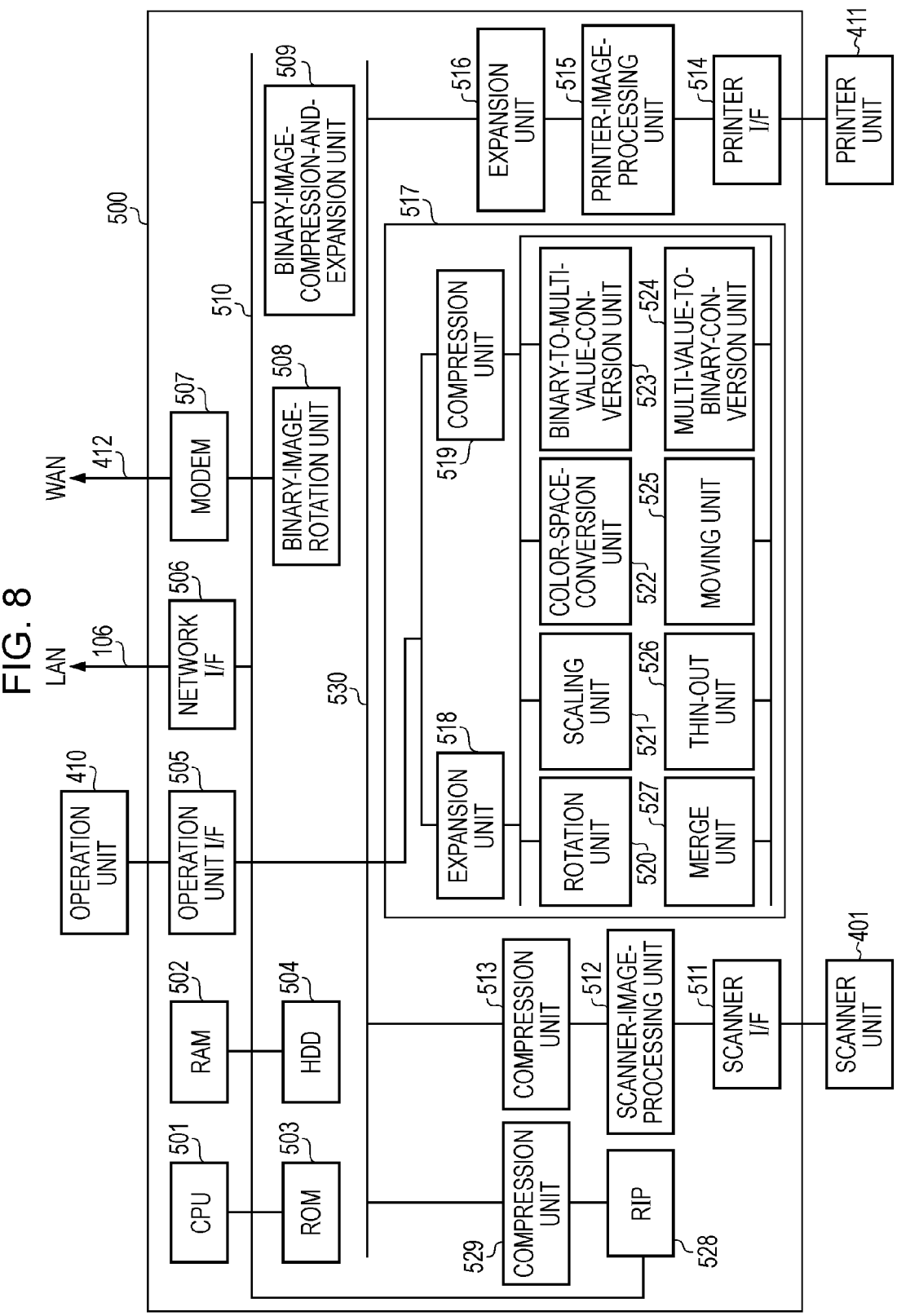
FIG. 8 is a block diagram illustrating the image-forming apparatus in detail with particular emphasis on a controller shown in FIG. 7.

FIG. 8 is a block diagram illustrating the image-forming apparatus 104 and/or the image-forming apparatus 105 shown in FIG. 1. The controller 500 is electrically connected to the scanner unit 401, an operation unit 410, and a printer unit 411. The controller 500 is connected to the print server 103, an external device, etc., via the LAN 106 and/or a wide-area network (WAN) 412. Subsequently, inputting and/or outputting print data and/or device information can be achieved.

A CPU 501 has centralized control over accesses to various devices connected to the controller 500 based on a control program, etc. stored in a ROM 503, and various processing procedures performed in the controller 500.

A RAM 502 functions as a system-work memory provided for the CPU 501 operating. The RAM 502 also functions as a memory where print data is stored temporarily. The RAM 502 includes a static random-access memory (SRAM) where data is stored after the power is turned off and a dynamic random-access memory (DRAM) where stored data is deleted after the power is turned off.

The ROM 503 stores, for example, a program executed to boot the image-forming apparatus 104/105. A hard disk drive (HDD) 504 can store a system-software program and/or print data.

An operation-unit interface (I/F) 505 is an interface unit provided to connect a system bus 510 to the operation unit 410. The operation-unit I/F 505 receives print data transmitted from the system bus 510, where the image of the print data is shown on the operation unit 410, transmits the print data to the operation unit 410, and transmits information transmitted from the operation unit 410 to the system bus 510.

A network I/F 506 is connected to the LAN 106 and the system bus 510 to input and/or output information. A modem 507 is connected to the WAN 412 and the system bus 510 to input and/or output information.

A binary-image-rotation unit 508 changes the orientation of an image of print data which is not yet transmitted. A binary-image-compression-and-expansion unit 509 changes the resolution of the print data which is not yet transmitted to a predetermined resolution and/or the resolution corresponding to the capacity of a destination device and/or apparatus. Here, the print data is compressed and/or expanded under the Joint Bi-level Image experts Group (JBIG) system, the Modified Modified READ (MMR) system, the Modified READ (MR) system, the modified huffman (MH) system, etc. An image bus 530 is a transmission path used to exchange the print data. The image bus 530 includes a peripheral component interconnect (PCI) bus and/or Institute of Electrical and Electronics Engineers (IEEE) 1394.

A scanner-image-processing unit 512 corrects, processes, and edits print data transmitted from the scanner unit 401 via a scanner I/F 511. Further, the scanner-image-processing unit 512 determines whether the transmitted print data is color-print data or monochrome-print data, and, for example, whether the transmitted print data is on text or a photograph. Then, the scanner-image-processing unit 512 adds information about the determination result to the print data. The added information is referred to as attribute data. Details on processing performed by the scanner-image-processing unit 512 are described below. A compression unit 513 receives the print data and divides the print data into 32×32-pixel blocks. The print data including the 32×32-pixel blocks is referred to as tile data.

Figure 9:
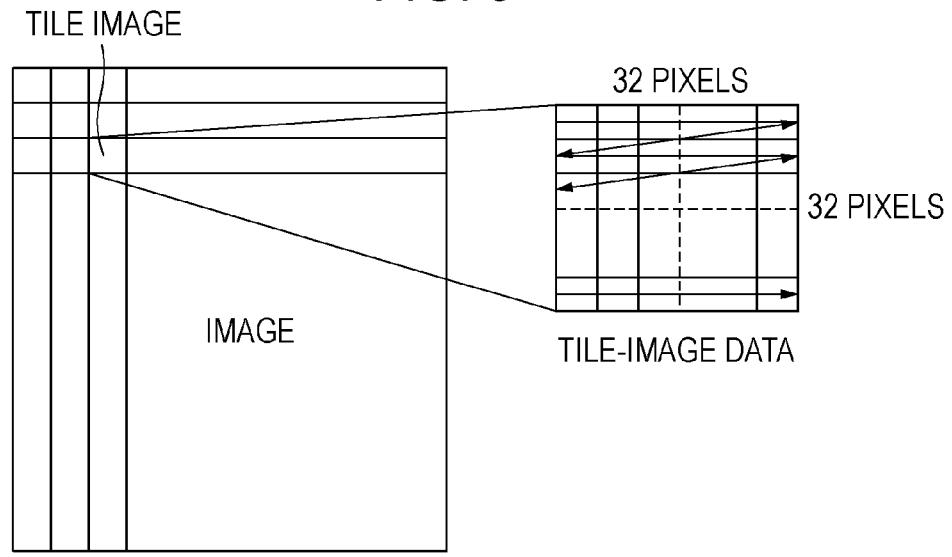
FIG. 9 is an illustration of tile data.

FIG. 9 is an illustration of the tile data.

The area corresponding to the tile data is referred to as a tile image. Here, information about the average brightness of the 32×32-pixel block and/or information about the coordinate position of the tile image on the document is added to the tile data as header information. Further, the compression unit 513 compresses print data including at least two items of tile data.

An expansion unit 516 expands print data including the at least two items of tile data, performs raster expansion for the expanded print data, and transmits the print data to a printer-image-processing unit 515.

Upon receiving the print data transmitted from the expansion unit 516, the printer-image-processing unit 515 performs image processing for the print data with reference to the attribute data added to the print data. After being subjected to the image processing, the print data is transmitted to the printer unit 411 via a printer I/F 514. Details on the processing performed by the printer-image-processing unit 515 are described below.

An image-conversion unit 517 performs predetermined conversion processing for the print data. The image-conversion unit 517 includes an expansion unit 518 configured to expand the transmitted print data, a compression unit 519 configured to compress the transmitted print data, a rotation unit 520 configured to rotate the image of the transmitted print data, and a scale unit 521 configured to perform resolution-change processing for the transmitted print data (from 600 dpi to 200 dpi, for example).

A color-space-conversion unit 522 converts the color space of the transmitted print data. The color-space-conversion unit 522 performs known background-eliminating processing by using a matrix and/or a table. The color-space-conversion unit 522 also performs known log-conversion processing (RGB→CMY) and/or known output-color-correction processing (CMY→CMYK).

A binary-to-multi-value-conversion unit 523 converts transmitted print data of two gradations into print data of 256 gradations. On the contrary, a multi-value-to-binary-conversion unit 524 converts transmitted print data of 256 gradations into print data of two gradations according to the error-diffusion method, etc.

A merge unit 527 merges the two types of print data transmitted thereto and generates print data shown on a single form. The two types of print data may be merged according to the method of determining the average of brightness values of pixels for merging to be a merge-brightness value and/or the method of determining the brightness value of a pixel with brightness level higher than those of other pixels to be the brightness value of each of the merged pixels.

Further, the two types of print data may be merged according to the method of determining the brightness value of a pixel with brightness level lower than those of other pixels to be the brightness value of each of the merged pixels. Still further, the brightness value of each of merged pixels may be determined by performing an OR operation, an AND operation, an exclusive OR operation, etc. for pixels for merging. Each of the above-described merging methods is widely known, and thus detailed descriptions are omitted herein.

A thin-out unit 526 changes the resolution of print data transmitted thereto by thinning out pixels of the print data, and generates the print data corresponding to a second, a fourth, an eighth, etc. of the original print data. A moving unit 525 adds and/or deletes a margin part to and/or from the print data transmitted thereto.

A raster image processor (RIP) 528 receives intermediate data generated based on page-description-language (PDL) code data transmitted from the print server 103, etc. and generates bitmap data (multi-value data).

Next, the scanner-image-processing unit 512 will be described.

Figure 10:
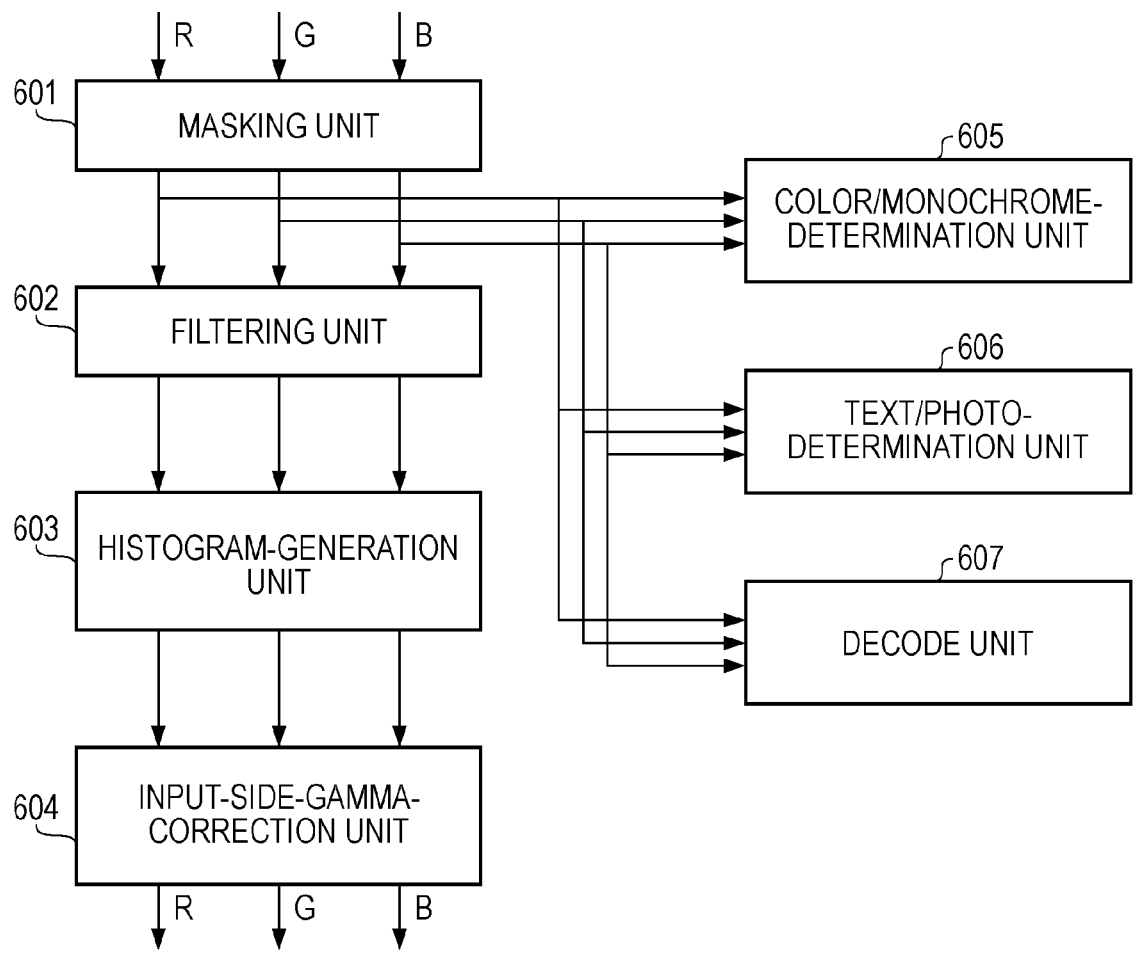
FIG. 10 is a block diagram showing a scanner-image-processing unit shown in FIG. 8.

FIG. 10 is a block diagram showing the scanner-image-processing unit 512 shown in FIG. 8.

Hereinafter, the configuration and operations of the scanner-image-processing unit 512 will be described.

In FIG. 10, the scanner-image-processing unit 512 receives print data including a brightness signal including red, green, and blue eight-bit components. A masking unit 601 converts the brightness signal into a standard brightness signal that does not depend on the color of a filter of a charge-coupled device (CCD).

A filtering unit 602 arbitrarily corrects the space frequency of the print data transmitted thereto. The filtering unit 602 performs calculation processing for the transmitted print data by using, for example, a 7×7 matrix.

In the case where a copier and/or a multifunctional machine is used, the user can select text mode, photograph mode, or text/photograph mode, etc., as copy mode, by operating the operation unit 410.

If the user selects the text mode, the filtering unit 602 subjects the entire print data to text filtering. When the photograph mode is selected, the entire print data is subjected to photograph filtering. When the text/photograph mode is selected, the filtering type is adaptively changed for each of pixels according to a text-photograph-determination signal (part of attribute data), which will be described below.

In other words, it is determined which of the photograph filtering and the text filtering should be performed for each of the pixels. Here, a predetermined coefficient is determined for the photograph filtering so that only a high-frequency component is smoothed, which reduces the roughness of an image. Further, another predetermined coefficient is determined for the text filtering so that the edge of an image is enhanced to a large extent, which increases the sharpness of the text image.

A histogram-generation unit 603 samples brightness data of each of pixels generating the print data transmitted thereto. More specifically, the histogram-generation nit 603 samples the brightness data corresponding to a rectangular area in each of the main-scanning direction and the sub-scanning direction at regular intervals, where the rectangular area is surrounded by a start point and end point that are specified in each of the main-scanning direction and the sub-scanning direction.

Then, the histogram-generation unit 603 generates histogram data based on the sampling result. The generated histogram data is used to estimate the background level to perform the background-eliminating processing. An input-side-gamma-correction unit 604 converts the histogram data into brightness data with nonlinear characteristics by using a table, etc.

A color-monochrome-determination unit 605 determines whether each of the pixels generating the print data transmitted thereto has chromatic color or achromatic color and adds information about the determination result to the print data, as a color-monochrome-determination signal (part of the attribute data).

A text-photograph-determination unit 606 determines each of the pixels generating the print data to be a pixel included in text data, a pixel included in a grid of dots, a pixel included in data on text shown in the grid of dots, or a pixel included in data on a solid image on the basis of the value of each of the pixels and the values of pixels adjacent to the each of the pixels.

A pixel which is not equivalent to any of the above-described pixels is determined to be a pixel generating a blank area. Information about the determination result is added to the print data as the text-photograph-determination signal (part of the attribute data).

If code-print data is included in the print data transmitted from the masking unit 601, a decode unit 607 detects the code-print data. Then, the decode unit 607 decodes the detected code-print data and retrieves information therefrom.

Next, the printer-image-processing unit 515 will be described.

Figure 11:
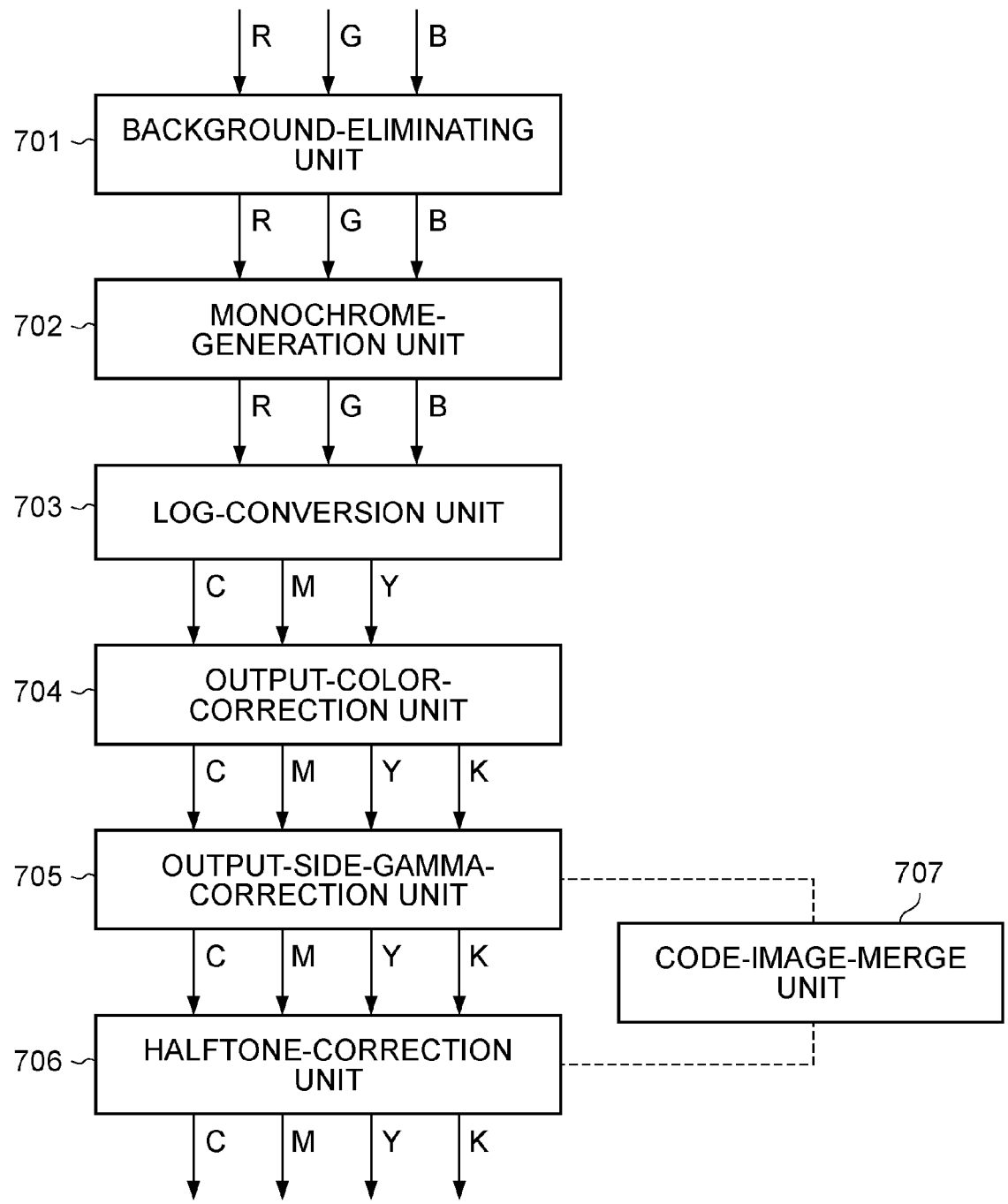
FIG. 11 is a block diagram of a printer-image-processing unit shown in FIG. 8.

FIG. 11 is a block diagram of the printer-image-processing unit 515 shown in FIG. 8.

Hereinafter, the configuration and operations of the printer-image-processing unit 515 will be described.

In FIG. 11, a background-eliminating unit 701 eliminates the background color of print data by using the histogram data generated by the scanner-image-processing unit 512. A monochrome-generation unit 702 converts color data into monochrome data.

A log-conversion unit 703 performs brightness-density conversion. The log-conversion unit 703 converts RGB-inputted print data into CMY-print data. An output-color-correction unit 704 performs output-color correction. For example, the log-conversion unit 703 converts CMY-inputted print data into CMYK-print data by using a table and/or a matrix.

An output-side-gamma-correction unit 705 performs correction so that the value of a signal transmitted thereto is proportionate to the value of reflection density obtained after copying and outputting are performed.

A halftone-correction unit 706 performs halftone processing according to the number of gradations achieved by a printer unit which outputs a copy result. For example, the halftone-correction unit 706 converts transmitted high-gradation print data into base-two data and/or base-thirty-two data. A code-image-merge unit 707 merges background-print data generated by a meta-data-image-generation unit, which is described below, with print data (shown on a document).

Each of the above-described processing units provided in the scanner-image-processing unit 512 and the printer-image-processing unit 515 can output transmitted print data without performing processing for the transmitted print data. Hereinafter, allowing data to pass through a predetermined processing unit without performing processing for the data is referred to as "letting data pass through a processing unit".

Next, operations performed to generate a printed matter including the copy-protection information and the copy-protection-cancellation information will be described.

Figure 12:
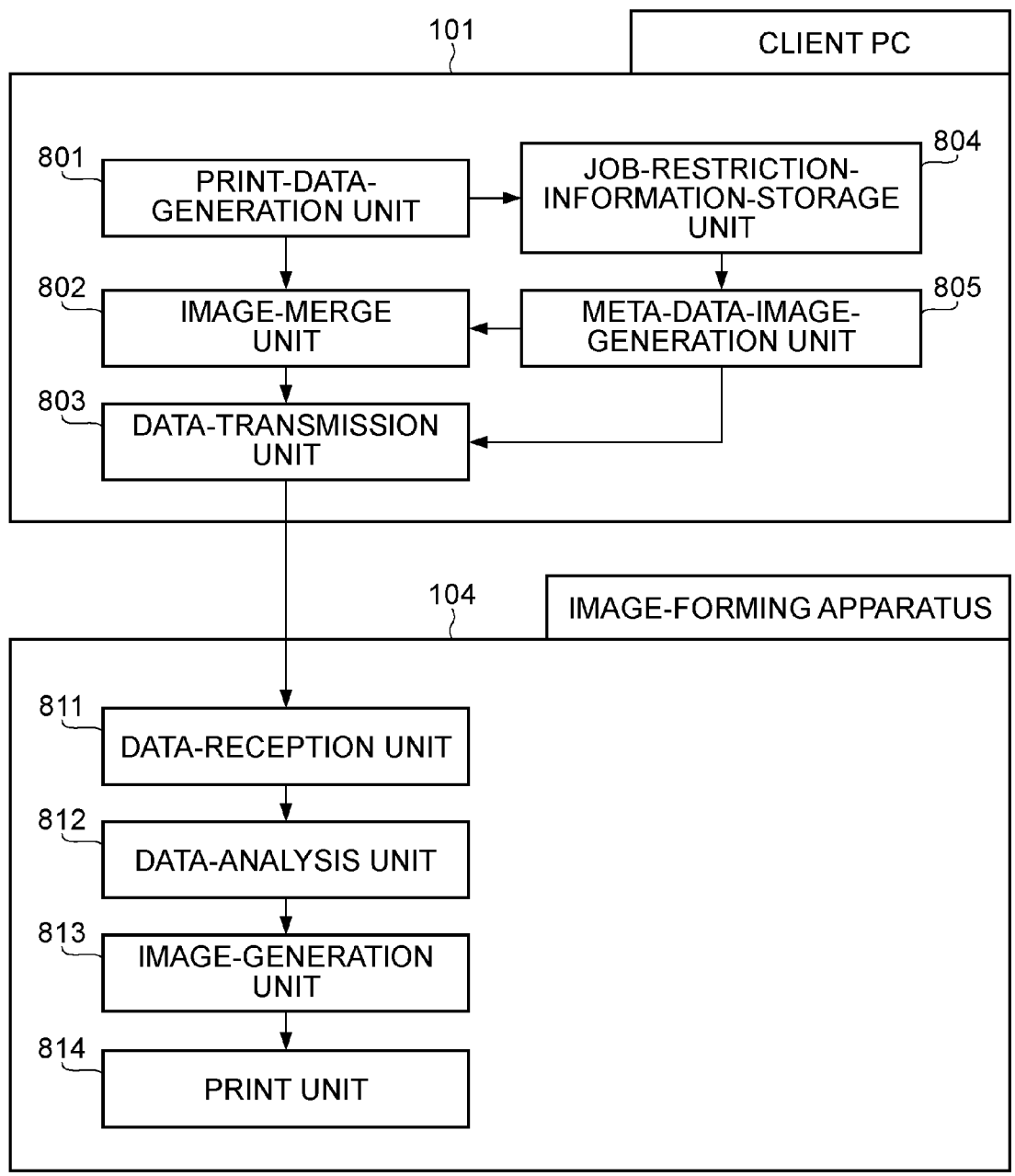
FIG. 12 is a logical configuration diagram showing the flow of data processing performed in the client PC and the image-forming apparatus that are shown in FIG. 1.

FIG. 12 shows an example where the printed matter including the copy-protection information and the copy-protection-cancellation information is generated in the configuration shown in FIG. 1. In the following description, the user selects the mode "output document used to cancel copy protection with an original document" in the print-security-setting-dialogue image 201.

FIG. 12 shows the functional configuration of each of the client PC 101 and the image-forming apparatus 104 that are shown in FIG. 1. More specifically, FIG. 12 is a data-flow diagram showing how a printed matter is generated in the case where a mounting method performed to generate data on a background-image shown on a printed matter on the client-PC side is used. There may not be a one-to-one correspondence between each of blocks shown in the data-flow diagram and each of physical components provided in the client PC 101 and/or the image-forming apparatus 104.

Hereinafter, the central-processing unit (CPU) of the client PC 101 makes determinations and performs operations. When the user issues a print instruction, a print-data-generation unit 801 is started in the client PC 101. The print-data-generation unit 801 is achieved by a print-sub system where a printer driver and an operating system (OS) operate in cooperation.

The print-data-generation unit 801 converts document data for printing into a set of drawing commands issued to the image-forming apparatus 104. More specifically, the conversion is achieved by generating print data written in PDL.

The print-data-generation unit 801 transmits the generated print data to an image-merge unit 802. At the same time, the print-data-generation unit 801 generates unique identification information (document ID) for every generated print data and transmits the document-ID information to a job-restriction-information-storage unit 804.

The job-restriction-information-storage unit 804 stores the job-restriction information set in the print-security-setting-dialogue image 201 shown in FIG. 4 and the document-ID information. The job-restriction information and the document-ID information are transmitted to a meta-data-image-generation unit 805. The document-ID information stored in the job-restriction-information-storage unit 804 is retained until a job is finished.

In the meta-data-image-generation unit 805, background-print data including copy-protection information is generated based on the job-restriction information and the document-ID information that are transmitted from the job-restriction-information-storage unit 804. The above-described copy-protection information indicates that copying is prohibited and the ID of a document protected from copying. The above-described background-print data may be generated by using the above-described LVBC. The meta-data-image-generation unit 805 transmits the generated background-print data to the image-merge unit 802.

The image-merge unit 802 merges the print data transmitted from the print-data-generation unit 801 with the background-print data transmitted from the meta-data-image-generation unit 805, and generates print data so that a background image is shown on each of pages of a printed matter.

For example, the background-print data may be embedded in the print data, as overlay-form information. The image-merge unit 802 transmits the generated print data to the data-transmission unit 803.

Next, the print data corresponding to a document used to cancel copy protection is generated based on at least one item of the document-ID information stored in the job-restriction-information-storage unit 804. Here, when the user selects the mode "protect document from copying" in the print-security-setting-dialogue image 201, the print data corresponding to the document used to cancel copy protection is not generated. The meta-information-image-generation unit 805 generates the print data corresponding to the document used to cancel copy protection based on the background-print data including the copy-protection-cancellation information and print data showing contents indicating that the document is used to cancel the copy protection. The copy-protection-cancellation information indicates that the copy protection is cancelled and shows the ID of a document for which copy protection is cancelled. The meta-information-image-generation unit 805 transmits the generated print data to the data-transmission unit 803.

The data-transmission unit 803 controls a network interface and transmits the print data to the print server 103 and/or the image-forming apparatus 104. Although the print data may be transmitted to the image-forming apparatus 105 in place of the image-forming apparatus 104, the image-forming apparatus 104 is adopted in the following description for the sake of simplicity.

A data-reception unit 811 waits for data transmitted from the LAN 106 by controlling the network I/F 506. The data-reception unit 811 detects that data is transmitted from a different node provided on the LAN 106, and receives and transmits the transmitted data to an appropriate sub system according to the data type.

The data type can be identified via a number of methods. For example, when the transmission control protocol (TCP)/Internet protocol (IP) system is used to establish communications, the data type is usually identified based on a port number. In the present embodiment, transmitted data is print data including data on a drawing command issued to the image-forming apparatus 104.

The data-reception unit 811 identifies the transmitted data as print data, and transmits the print data to a data-analysis unit 812.

The data-analysis unit 812 retrieves data on the drawing command (PDL) from the print data transmitted from the data-reception unit 811, interprets the drawing-command data, and generates intermediate data internally used by the image-forming apparatus 104. The data-analysis unit 812 transmits items of the generated intermediate data to an image-generation unit 813 in sequence.

The image-generation unit 813 converts the intermediate data transmitted from the data-analysis unit 812 into bitmap-print data by controlling the RIP 528. The image-generation unit 813 compresses items of the bitmap-print data by using the compression unit 529, and transmits the items of bitmap-print data to a print unit 814 in sequence.

The print unit 814 controls the expansion unit 516, the printer-image-processing unit 515, the printer I/F 514, and the printer unit 411, and prints an image generated based on the bitmap-print data transmitted from the image-generation unit 813 on the sheet.

Figure 13:
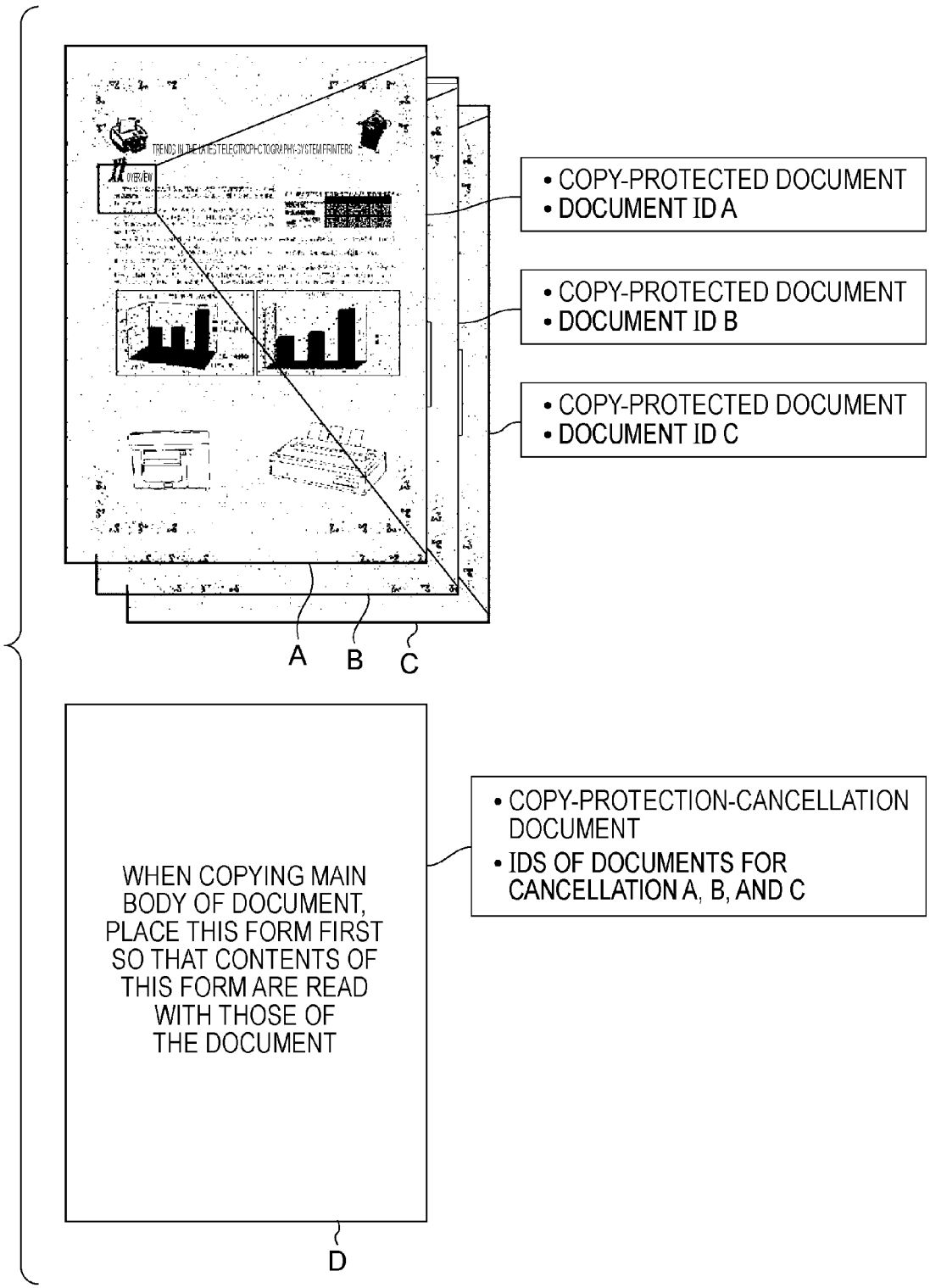
FIG. 13 shows a plurality of copy-protected documents and a single copy-protection-cancellation document.

FIG. 13 shows a document protected from copying (copy-protected document) and a document used to cancel the copy protection (copy-protection-cancellation document).

Next, processing procedures performed by the client PC 101 to output print data will now be described with reference to a flowchart of FIG. 14.

Figure 14:
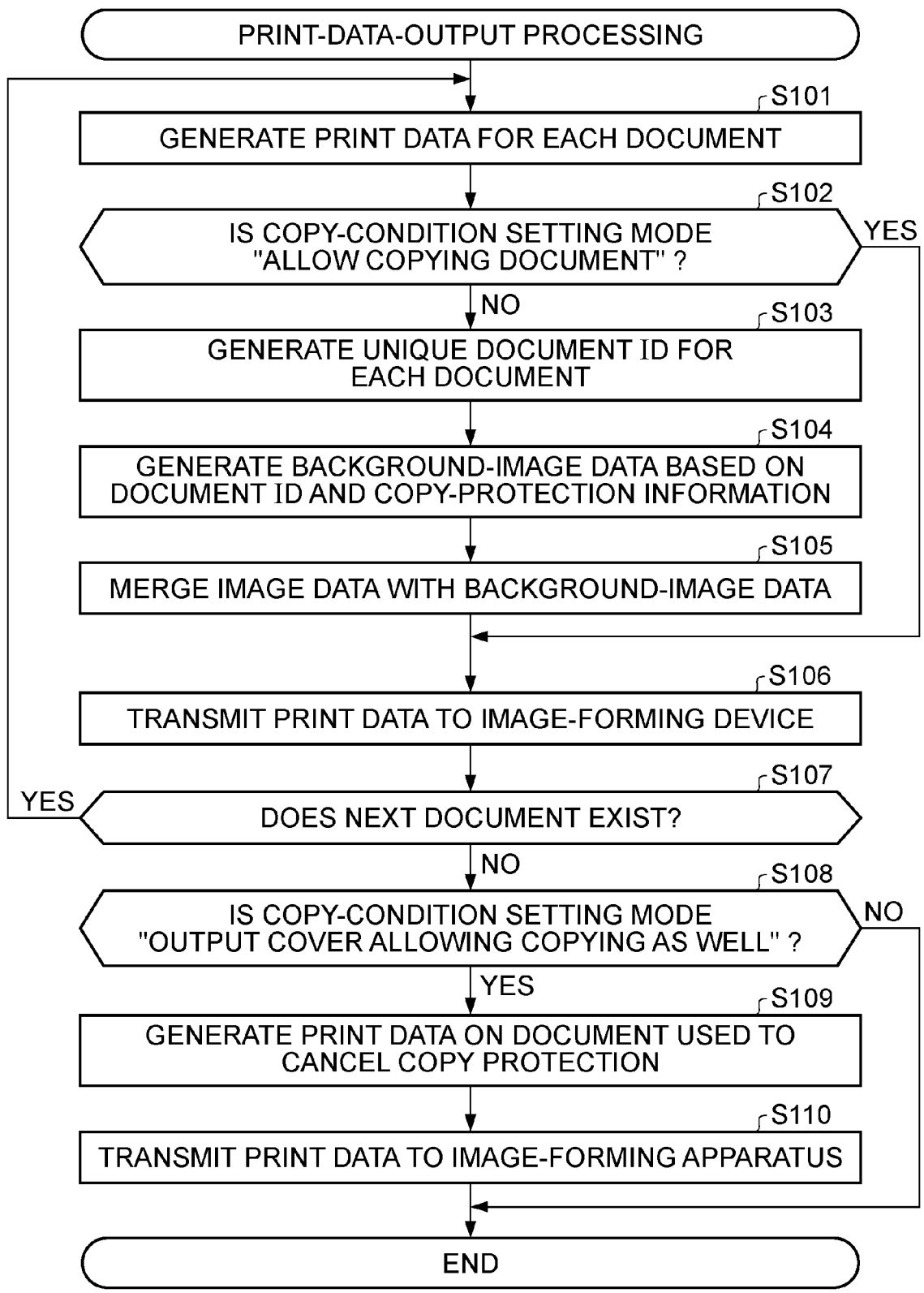
FIG. 14 is a flowchart showing print-data-output-processing procedures performed by the client PC shown in FIG. 1.

More specifically, the flowchart of FIG. 14 shows print-data-output processing procedures performed by the client PC 101 and/or the client PC 102 shown in FIG. 1.

In FIG. 14, first, the client PC 101 starts performing print-data-output processing when the user issues an instruction to perform printing.

At step S101, the print-data-generation unit 801 generates print data for each document.

At step S102, the client PC 101 determines whether the mode "allow copying document" is selected in the print-security-setting-dialogue image 201 shown in FIG. 4 based on the job-restriction information stored in the job-restriction-information-storage unit 804.

When the mode shown as "allow copying document" is selected, the processing advances to step S106 and the data-transmission unit 803 transmits the print data generated at step S101, as it is, to the image-forming apparatus 104.

When a mode different from the above-described mode, that is, the mode "protect document from copying" or the mode "output document used to cancel copy protection with an original document" is selected, the processing advances to step S103.

At step S103, the print-data-generation unit 801 generates unique document-ID information for each of documents and the unique document-ID information is stored in the job-restriction-information-storage unit 804.

At step S104, the meta-data-image-generation unit 805 generates background-print data based on the document-ID information and the copy-protection information that are stored at step S103.

At step S105, the image-merge unit 802 merges the print data generated at step S101 with the background-print data generated at step S104.

Next, at step S106, the data-transmission unit 803 transmits print data generated through the merge processing performed by the image-merge unit 802 to the image-forming apparatus 104.

At step S107, the client PC 101 determines whether another document should be generated. If the answer is "YES" at step S107, the processing returns to step S101 so that the processing procedures corresponding to steps S101 to 106 are performed again. If the answer is "NO" at step S107, the processing advances to step S108.

At step S108, the client PC 101 determines whether the mode "output document used to cancel copy protection with an original document" is selected in the print-security-setting-dialogue image 201 shown in FIG. 4 based on the job-restriction information stored in the job-restriction-information-storage unit 804. When the mode "output document used to cancel copy protection with an original document" is selected, the processing advances to step S109. If the mode shown as "protect document from copying" is selected, the processing terminates.

At step S109, the meta-data-image-generation unit 805 acquires information about at least one document ID from the job-restriction-information-storage unit 804 and generates the print data corresponding to the document used to cancel the copy protection (see FIG. 13).

At step S110, the data-transmission unit 803 transmits the print data generated at step S109 to the image-forming apparatus 104, and then the processing terminates.

Next, the copy-protected document generated, as shown in FIG. 12, and the copy-protection-cancellation document generated, as shown in FIG. 14 will be described with reference to FIG. 13.

If the mode "output document used to cancel copy protection with an original document" is selected, copy-protected documents A, B, and C, and a copy-protection-cancellation document D are output from the image-forming apparatus 104, as shown in FIG. 13.

Each of the copy-protected documents A, B, and C shows an image which the user wishes to output, information indicating that the document is protected from copying, and unique document-ID information that are printed thereon, as a background image. The background image is generated by using the above-described LVBC technology.

If the user tries to copy the copy-protected document alone by using the image-forming apparatus 104, etc., the user is warned that the document is protected from copying, as shown in FIG. 5, and the copy processing is discontinued.

On the other hand, information indicating that the document is the copy-protection-cancellation document and the ID of a document for copy-protection cancellation are embedded in the background image of the copy-protection-cancellation document D, as the copy-protection-cancellation information. In that case, each of signs A, B, and C is the ID of the document for copy-protection cancellation.

Further, a warning message "When copying main body of document, place this form first so that contents of this form are read with those of the document" is printed on the copy-protection-cancellation document. Thus, the user is informed that the document is the copy-protection-cancellation document, which should be read by the image-forming apparatus before reading the copy-protected document.

Next, the copy-protection operations and copy-protection-cancellation operations that are performed by the image-forming apparatus 104 will be described with reference to FIGS. 15 and 16.

Figure 15:
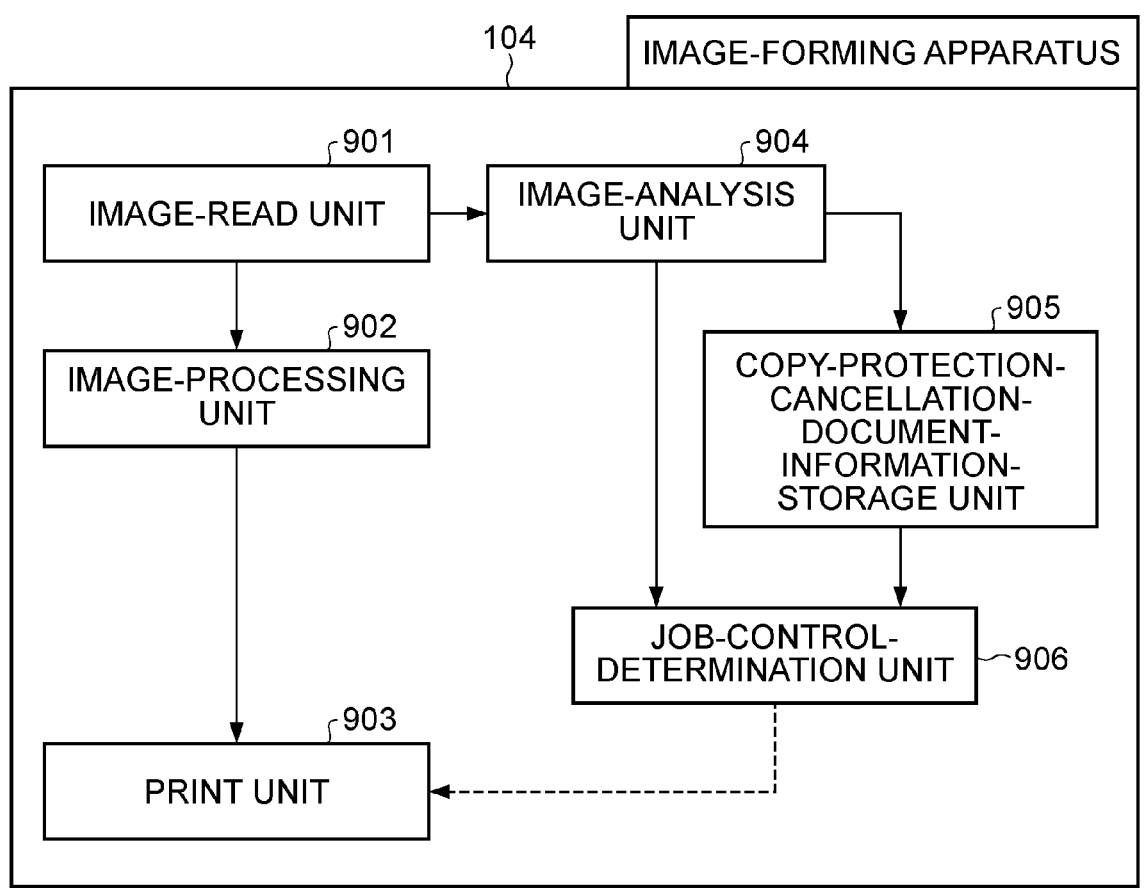
FIG. 15 is a block diagram illustrating copy-protection operations and copy-protection-cancellation operations that are performed by the image-forming apparatus.

FIG. 15 is a functional-configuration diagram illustrating the copy-protection operations and the copy-protection-cancellation operations that are performed by the image-forming apparatus 104.

When the user places a document including the copy-protection information on the scanner unit 401 and instructs the image-forming apparatus 104 to start copying the document by performing the operation unit 410, an image-read unit 901 is started.

The image-read unit 901 reads data on an image printed on the document by controlling the scanner unit 401, the scanner I/F 511, the scanner-image-processing unit 512, and the compression unit 513, and transmits the read print image to each of the image-processing unit 902 and an image-analysis unit 904.

The image-analysis unit 904 retrieves the copy-protection information and the document-ID information that are included in the image corresponding to the print data transmitted from the image-read unit 901 by controlling the decode unit 607. The image-analysis unit 904 transmits the retrieved copy-protection information and document-ID information to a job-control-determination unit 906.

If image data included in the print data transmitted from the image-read unit 901 includes the copy-protection-cancellation information, the image-analysis unit 904 retrieves the document-ID information used to identify a document for copy-protection cancellation. Then, the document-ID information is stored in a copy-protection-cancellation-document-information-storage unit 905 configured to store information about the document for copy-protection cancellation.

A job-control-determination unit 906 determines whether the copy operations should be stopped based on the copy-protection information transmitted from the image-analysis unit 904, the document-ID information, and the document-ID information stored in the copy-protection-cancellation-document-information-storage unit 905.

If it is determined that the copy operations should be stopped, the job-control-determination unit 906 issues and transmits an instruction to stop the copy operations to the print unit 903. Further, the job-control-determination unit 906 displays the warning message described in FIG. 5 on the operation unit 410 by controlling the operation-unit I/F 505.

The print unit 903 generates a printed matter by printing the print data transmitted from the image-processing unit 902 on a form. However, upon receiving the instruction to stop operating, the instruction being transmitted from the job-control-determination unit 906, the print unit 903 stops performing the print operations regardless of whether a job is finished.

Next, the copy-protection operations and the copy-protection-cancellation operations that are performed in the image-forming apparatus 104 will be described with reference to a flowchart of FIG. 16.

Figure 16:
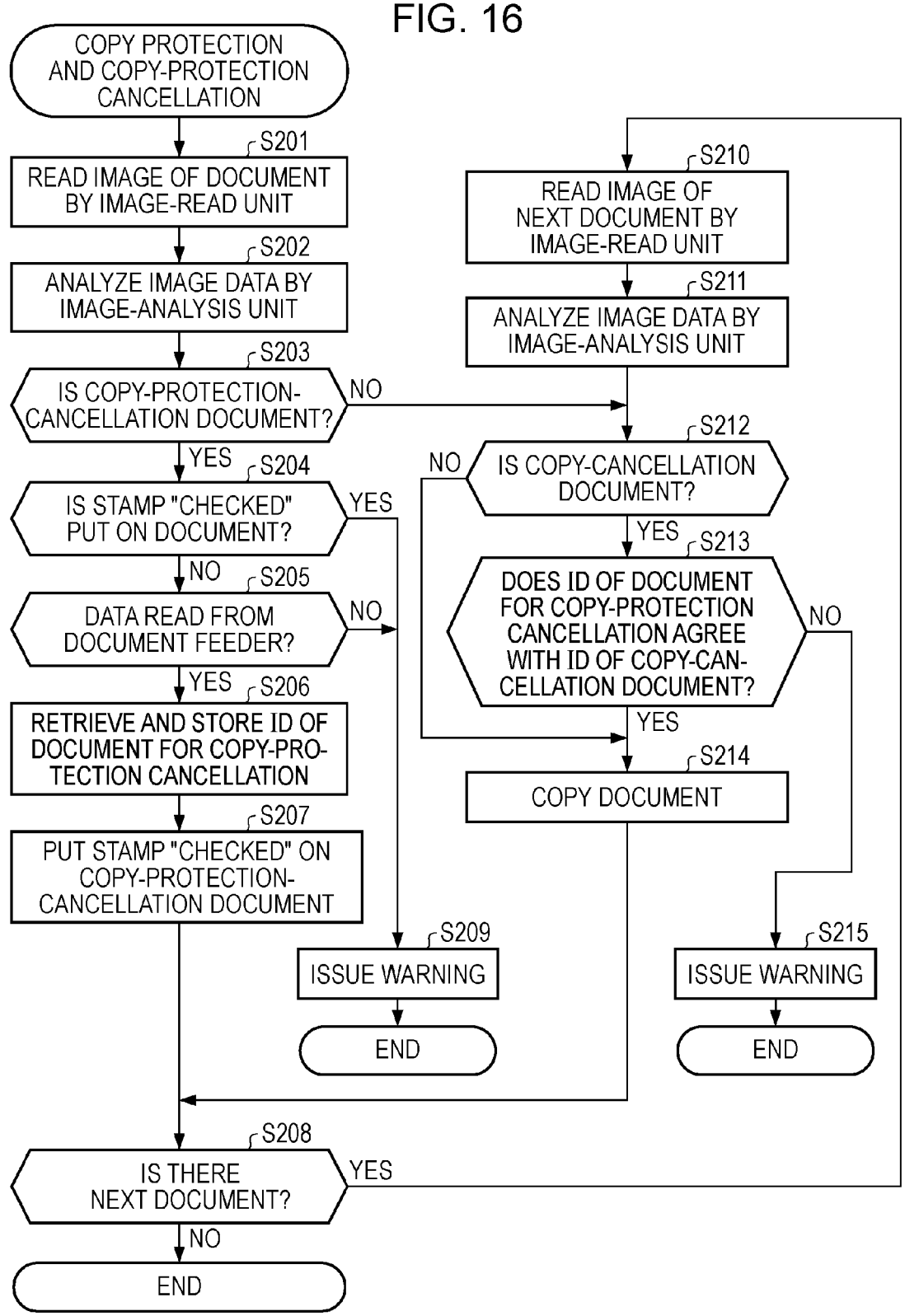
FIG. 16 is a flowchart showing copy-protection-processing procedures and copy-protection-cancellation-processing procedures that are performed by the image-forming apparatus shown in FIG. 8.

FIG. 16 is a flowchart showing the copy-protection-processing procedures and the copy-protection-cancellation-processing procedures performed by the image-forming apparatus 104 shown in FIG. 1.

According to the flowchart shown in FIG. 16, the image-forming apparatus 104 starts copying the document placed on the tray 403 of the scanner unit 401.

At step S201, the image-read unit 901 reads data on an image shown on a document fed by the document feeder 402 from the tray 403 of the scanner unit 401 and/or data on an image shown on a document which is directly placed on the glass plate of the scanner unit 401.

At step S202, the image-analysis unit 904 analyzes the print data including the image data read by the image-read unit 901.

At step S203, the image-analysis unit 904 determines whether a document showing the read image data is the copy-protection-cancellation document (see FIG. 13). That is, the image-analysis unit 904 determines whether the read image data includes the copy-protection-cancellation information. If it is determined that the document showing the read image data is the copy-protection-cancellation document, the processing advances to step S204. If the document showing the read image data is not the copy-protection-cancellation document, the processing advances to step S212.

At step S204, the image-analysis unit 904 determines whether the stamp indicating "checked" is put on the read image data. The stamp indicating "checked" is put on the read image data by the stamp 404 of the document feeder 402 to determine whether the document had been read, as shown in FIG. 6. The stamp is placed to prevent the copy-protection-cancellation document from being used a plurality of times.

If the stamp indicating "checked" is put on the copy-protection-cancellation document, the processing advances to step S209 where the user is warned that the copy-protection-cancellation document had already been used and the processing is terminated. If the stamp is not put on the copy-protection-cancellation document, the processing advances to step S205.

At step S205, the image-read unit 901 determines whether the document is fed by the document feeder 402 (reading data from the document feeder 402), or whether the document is directly placed on the glass plate of the scanner unit 401 (reading data from a pressure board).

When the document data is read from the document feeder 402, the processing advances to step S206. When the document data is not read from the document feeder, it is difficult for the stamp 404 to operate for the copy-protection-cancellation document, so the processing advances to step S209 where the user is warned and the processing is terminated.

At step S206, the image-analysis unit 904 retrieves information about the ID of the document for the copy-protection cancellation from the image data read by the image-read unit 901, and stores the read document-ID information in the copy-protection-cancellation-document-information-storage unit 905.

At step S207, the image-read unit 901 puts the stamp indicating "checked" on the copy-protection-cancellation document by using the stamp 404.

At step S208, the image-read unit 901 determines whether the next document exists on the tray 403 of the scanner unit 401 and/or the glass plate of the scanner unit 401. If the next document exists on the tray 403 and/or the glass plate, the processing advances to step S210.

At step S210, the image-read unit 901 reads data on an image shown on the next document.

At step S211, the image-analysis unit 904 analyzes the print data including the image data read by the image-read unit 901.

At step S212, the image-analysis unit 904 determines whether the currently read document is a copy-protected document, namely, whether the read image data includes the copy-protection information based on the analysis result. If the document is determined to be the copy-protected document, the processing advances to step S213. If it is determined that the document is not the copy-protected document, the processing advances to step S214.

At step S213, the image-analysis unit 904 retrieves the document-ID information from the image data read by the image-read unit 901 and the job-control-determination unit 906 compares the document-ID information to information about at least one document ID, where the information about the at least one document ID is stored in the copy-protection-cancellation-document-information-storage unit 905. Then, the job-control-determination unit 906 determines whether the retrieved document ID agrees with any one of the at least one document IDs.

If it is determined that the retrieved document ID agrees with one of the at least one document IDs, the copy protection is cancelled due to the copy-protection-cancellation document. Therefore, the processing advances to step S214.

At step S214, the print unit 903 prints image data on a form based on the print data transmitted from the image-processing unit 902.

If the retrieved document ID does not agree with any one of the at least one document IDs, the document corresponding to the retrieved document ID is protected from copying. In that case, the processing advances to step S215 so that a message indicating that the copying was not done is issued (see FIG. 5) and the processing is terminated.

Next, a method of generating the copy-protection-cancellation document in the image-forming apparatus will be described with reference to FIGS. 17 and 18.

Figure 17:
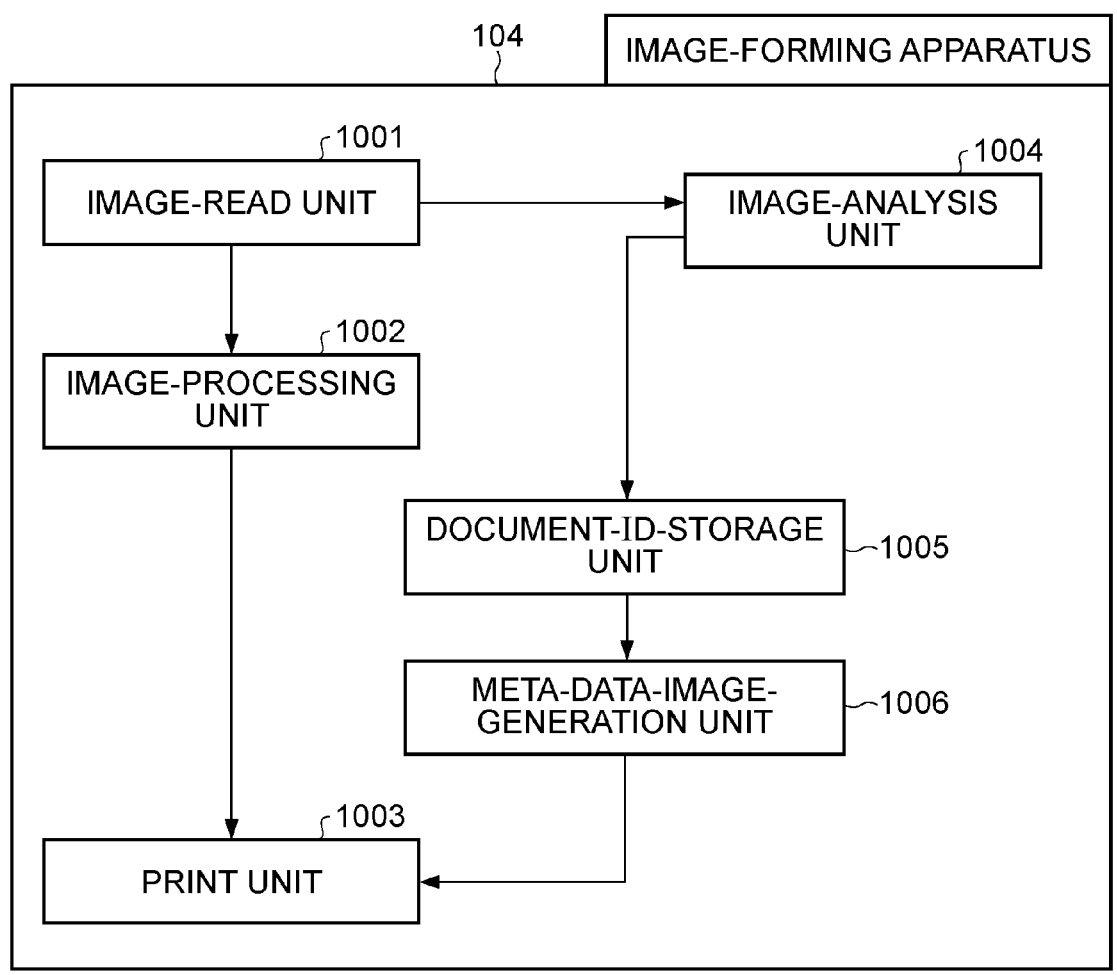
FIG. 17 is a block diagram illustrating how the image-forming apparatus generates image data including copy-protection information and copy-protection-cancellation information.

FIG. 17 is a block diagram illustrating the generation of a printed matter including the copy-protection-cancellation information by using the image-forming apparatus 104/105.

According to FIGS. 14 and 15, the image-forming apparatus 104 generates the printed matter including the copy-protection-cancellation information based on the premise that the user issues the print instruction through the client PC 101. However, the copy-protection-cancellation document may not be printed and output only by the print instruction transmitted from the client PC 101. That is, the image-forming apparatus 104 may be configured to print and output the copy-protection-cancellation document without receiving the print instruction transmitted from the client PC 101.

Operations of the image-forming apparatus 104 configured in the above-described manner will be described with reference to the block diagram of FIG. 17.

A copy-protection document used in that case is generated by the client PC 101 in advance, as shown in FIGS. 12 and 14, in the mode "protect document from copying" shown in FIG. 4.

The user sets copy-protection-cancellation-generation mode for the image-forming apparatus 104 in advance. However, the use of the copy-protection-cancellation-generation mode is not permitted for an arbitrary user. Namely, the use of the copy-protection-cancellation-generation mode is restricted to a predetermined user, such as a user who knows a specific code number.

When the user places a document including the copy-protection information on the scanner unit 401 and issues an instruction to start copying by operating the operation unit 410, an image-read unit 1001 is started.

The image-read unit 1001 reads image data shown on the document by controlling the scanner unit 401, the scanner I/F 511, the scanner-image-processing unit 512, and the compression unit 513, and transmits the print data corresponding to the read image data to an image-processing unit 1002 and an image-analysis unit 1004.

The image-analysis unit 1004 retrieves the copy-protection information and information about the ID of the document that are included in the image data included in the print data transmitted from the image-read unit 1001 by controlling the decode unit 607. The image-analysis unit 1004 transmits the retrieved copy-protection information and document-ID information to a document-ID-storage unit 1005.

After reading data shown on each of copy-protection documents, a meta-data-image-generation unit 1006 generates print data included in a copy-protection-cancellation document based on information about at least one document ID, where the document-ID information is stored in the document-ID-storage unit 1005.

The print data generated by the meta-data-image-generation unit 1006 is output from a print unit 1003.

Next, processing procedures performed by the image-forming apparatus 104 to generate the copy-protection-cancellation document, will be described with reference to a flowchart of FIG. 18.

Figure 18:
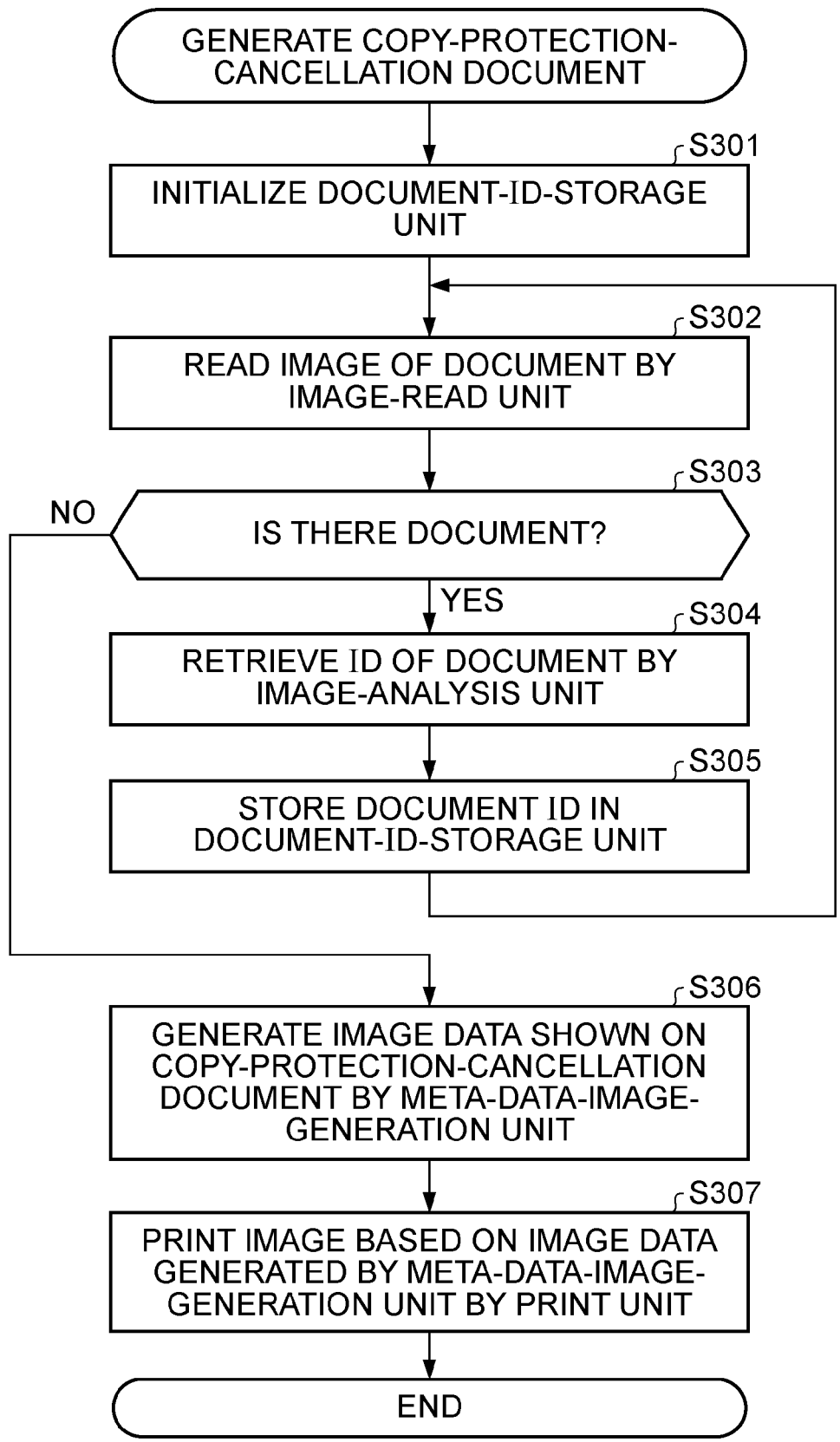
FIG. 18 is a flowchart illustrating processing procedures performed by the image-forming apparatus shown in FIG. 8, so as to generate a copy-protection-cancellation document.

FIG. 18 is a flowchart showing processing procedures performed by the image-forming apparatus shown in FIG. 8 to generate the copy-protection-cancellation document.

According to the processing procedures shown in FIG. 18, the user places the image-forming apparatus 104 in the copy-protection-cancellation-document-generation mode, places a copy-protected document on the scanner unit 401, and issues an instruction to start copying by operating the operation unit 410.

At step S301, the image-forming apparatus 104 initializes the document-ID-storage unit 1005 so that any group of document IDs of copy-protected documents used in the past is not left in the document-ID-storage unit 1005.

At step S302, the image-read unit 1001 reads image data shown on the copy-protected document. At step S303, the image-read unit 1001 determines whether the document exists. If the document exists, the processing advances to step S304. If the document does not exist, the processing advances to step S306.

At step S304, the image-analysis unit 1004 analyzes the print data corresponding to the image data read by the image-read unit 1001.

At step S305, the image-analysis unit 1004 stores document-ID information retrieved from the image data read by the image-read unit 1001 in the document-ID-storage unit 1005.

At step S306, since data on each of copy-protected documents is read, the meta-data-image-generation unit 1006 generates the print data corresponding to a copy-protection-cancellation document based on the information about a group of the IDs of the copy-protected documents, where the document-ID information is stored in the document-ID-storage unit 1005.

At step S307, the print unit 1003 prints an image on a form based on the print data corresponding to the copy-protection-cancellation document, where the print data is generated by the meta-data-image-generation unit 1006.

The above-described features of the present invention can also be achieved by supplying a storage medium storing program code of software for implementing the functions of the above-described embodiments to an apparatus and/or a system so that a computer (a CPU, a microprocessor unit (MPU), etc.) of the apparatus and/or the system reads and executes the program code stored in the storage medium.

In that case, the program code itself, read from the storage medium, achieves the functions of the above-described embodiments, and thus the storage medium storing the program code and the program code itself constitute the present invention.

The storage medium for providing the program code may be, for example, a floppy disk, a hard disk, a magneto-optical disk, a compact disk (CD)-read only memory (ROM), a CDrecordable (R), a CD-rewritable (RW), a digital versatile disk (DVD)-ROM, a DVD-random access memory (RAM), a DVD-RW, a DVD+RW, a magnetic tape, a nonvolatile memory card, a ROM, and so forth. The program code may be downloaded to the apparatus and/or the system via a network.

Further, not only by the computer reading and executing the program code, but also by the computer executing part of or the entire process utilizing an operating system (OS), etc. running on the computer based on instructions of the program code, the functions of the above-described embodiments may be achieved.

The program code read from the storage medium may be written into a memory of a function-expansion board inserted in the computer and/or a function-expansion unit connected to the computer, and a CPU or the like of the function-expansion board and/or the function-expansion unit executes part of or the entire actual processing based on the instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-044309 filed on Feb. 23, 2007, which is hereby incorporated by reference herein in its entirety.

What is claimed is:

1. An apparatus comprising:
a first generation unit configured to generate print data where first information is embedded in the print data;
a second generation unit configured to generate different print data where information used to cancel embedded first information is embedded in the different print data; and
a transmission unit configured to transmit the print data and the different print data, wherein the print data and the different print data are printed separately.

2. The apparatus according to claim 1, wherein the first information is copy-protection information.

3. An apparatus comprising:
a first determination unit configured to determine whether a first image data on a first form includes copy-protection information;
a second determination unit configured to determine whether a second image data, on a second form different from the first form, including copy-protection-cancellation information used to cancel the copy-protection information is read when the first determination unit determines that the first image data includes the copy-protection information; and
an output unit configured to output the first image data including the copy-protection information if it is determined that the second image data is read.

4. The apparatus according to claim 3, further comprising a read unit, wherein when the read unit reads a third form including the copy-protection-cancellation information, the read unit cancels the copy-protection-cancellation information embedded in the second form.

5. An image-forming apparatus comprising:
an image-read unit configured to read image data;
a first determination unit configured to determine whether read image data includes copy-protection-cancellation information indicating cancellation of copy protection;
a storage unit configured to store first identification information when it is determined that the read image data includes copy-protection-cancellation information, wherein the first identification information is included in the image data including the copy-protection-cancellation information;
a second determination unit configured to determine whether the read image data includes copy-protection information indicating copy protection;
a comparison unit configured to compare the first identification information with a second identification information included in the image data including the copy-protection information when it is determined that the read image data includes the copy-protection information;
a print unit configured to perform printing based on the image data including the copy-protection information when a comparison result shows that the first identification information agrees with the second identification information; and
a prohibition unit configured to prohibit printing based on the image data including the copy-protection information when the comparison result shows that the first identification information does not agree with the second identification information.

6. A method comprising:
generating print data where first information is embedded in the print data;
generating different print data where information used to cancel embedded first information is embedded in the different print data; and
transmitting the print data and the different print data, wherein the print data and the different print data are printed on different forms.

7. A computer-readable storage medium storing computer-readable instructions, the computer-readable instructions causing a computer to execute the method of claim 6.

* * * * *